(12) United States Patent
Giacomozzi et al.

(10) Patent No.: US 12,210,032 B2
(45) Date of Patent: Jan. 28, 2025

(54) VIBRATION REMOTE SENSOR BASED ON SPECKLES TRACKING, WHICH USES AN OPTICAL-INERTIAL ACCELEROMETER, AND METHOD FOR CORRECTING THE VIBRATIONAL NOISE OF SUCH A SENSOR

(71) Applicant: SPACEARTH TECHNOLOGY S.R.L., Rome (IT)

(72) Inventors: Emanuele Giacomozzi, Rome (IT); Silvio Bianchi, Rome (IT); Cesidio Bianchi, Rome (IT); Vincenzo Romano, Mentana (IT); Andrea Tertulliani, Rome (IT)

(73) Assignee: Spacearth Technology S.R.L., Rome (IT)

( * ) Notice: Subject to any disclaimer, the term of this patent is extended or adjusted under 35 U.S.C. 154(b) by 313 days.

(21) Appl. No.: 17/914,421

(22) PCT Filed: Mar. 18, 2021

(86) PCT No.: PCT/IB2021/052282
§ 371 (c)(1),
(2) Date: Sep. 26, 2022

(87) PCT Pub. No.: WO2021/198834
PCT Pub. Date: Oct. 7, 2021

(65) Prior Publication Data
US 2023/0105395 A1    Apr. 6, 2023

(30) Foreign Application Priority Data

Mar. 31, 2020  (IT) .................. 102020000006703

(51) Int. Cl.
*G01P 15/093*    (2006.01)
*G01P 15/13*    (2006.01)
*G02B 27/48*    (2006.01)

(52) U.S. Cl.
CPC .......... *G01P 15/093* (2013.01); *G01P 15/132* (2013.01); *G02B 27/48* (2013.01)

(58) Field of Classification Search
CPC ..... G01P 15/093; G01P 15/132; G02B 27/48; G01H 1/00; G01H 9/00
See application file for complete search history.

(56) References Cited

U.S. PATENT DOCUMENTS

| | | |
|---|---|---|
| 4,726,650 A | 2/1988 | Grissom |
| 5,789,677 A | 8/1998 | McEachern |

(Continued)

OTHER PUBLICATIONS

International Search Report and Written Opinion for International Patent Application No. PCT/IB2021/052282, mailed Jun. 18, 2021.

(Continued)

*Primary Examiner* — Xin Y Zhong
(74) *Attorney, Agent, or Firm* — Armstrong Teasdale LLP

(57) ABSTRACT

A remote sensor based on speckle tracking which uses an inertial-optical accelerometer is provided. The remote sensor makes it possible to correct the speckle pattern correlation centroid value in the presence of displacements due to vibrational noise. The inertial-optical accelerometer instantaneously highlights displacements of the sensor relative to an inertial reference, that is of a mass immovable with respect to the fixed stars, installed in the optical axis of the remote sensor.

7 Claims, 4 Drawing Sheets

(56) References Cited

U.S. PATENT DOCUMENTS

2007/0165907 A1     7/2007  Schroeder et al.
2019/0063898 A1*    2/2019  Zalevsky ................. G01P 3/38

OTHER PUBLICATIONS

Bianchi S. and Giacomozzi E., Long-range detection of acoustic vibrations by speckle tracking, Applied Optics, Oct. 1, 2019, pp. 7805-7809, vol. 58, No. 28, Optical Society of America, US.
Bianchi S., Vibration detection by observation of speckle patterns, Applied Optics, Feb. 10, 2014, pp. 931-936, vol. 53, Issue 5, Optical Society of America, US.
Zalevsky Z. et al., Simultaneous remote extraction of multiple speech sources and heart beats from secondary speckles pattern, Optics Express, Nov. 23, 2009, pp. 21566-21580, vol. 17, Issue 24, Optical Society of America, US.
Peterson J. R., Observations and modeling of seismic background noise, Open-File Report 93-322, 1993, U.S. Geological Survey.
Wallace J., Photonics Products: Vibration-Isolation Tables: Isolation tables support stable optical setups, Laser Focus World, Optics, Mar. 9, 2015, vol. 51, Issue 3, Endeavor Business Media, US.
Raffai P. et al., Inverted pendulum as low-frequency pre-isolation for advanced gravitational wave detectors, Nuclear Instruments and Methods in Physics Research Section A, 2001, Elsevier Science.
Galupov et al., Physical Principles of a Piezo Accelerometer Sensitive to a Nearly Constant Signal, Sensors, Sep. 28, 2018, vol. 18, Issue 10, Article 3258, MDPI, Basel, CH.
PCB Piezotronics, Series 393, Sensors for seismic testing 2019, pcb.com/seismic.

* cited by examiner

VIBRATION REMOTE SENSOR BASED ON SPECKLES TRACKING, WHICH USES AN OPTICAL-INERTIAL ACCELEROMETER, AND METHOD FOR CORRECTING THE VIBRATIONAL NOISE OF SUCH A SENSOR

CROSS-REFERENCE TO RELATED APPLICATIONS

This application is a National Phase filing of PCT International Application No. PCT/IB2021/052282, having an International Filing Date of Mar. 18, 2021, claiming priority to Italian Patent Application No. 102020000006703, having a filing date of Mar. 31, 2020 each of which is hereby incorporated by reference in its entirety.

FIELD OF THE INVENTION

The present invention relates to a remote sensor based on speckle tracking, which utilizes an optical-inertial accelerometer and a correction method of the vibrational noise of said remote sensor, equally using the accelerometer.

PRIOR ART

Vibration remote sensors based on speckle tracking have been developed to operate in the acoustic band (20-12000 Hz) as described, inter alia, in various publications in international literature [1]-[3].

A vibration remote sensors based on speckle tracking is an optical receiver-transmitter system, which transmits a 532 nm laser beam, a coherent light which is scattered by a vibrating surface, the irregularities of which produce small spots (or speckles). A receiver optical system, which ends in a photosensor (CCD), receives the granular image of the moving speckles. A mathematical algorithm then reconstructs the vibrations of the surface hit by the laser beam starting from the overall movement of the speckles (speckle pattern tracking).

The remote sensors based on speckle tracking mainly measures the angular velocity $d\theta/dt$, the fundamental frequencies, and the harmonics of the investigated surface. Displacements and angular accelerations can be inferred from these data with simple on-line operations. Furthermore, other kinematic parameters can also be determined from the knowledge of the geometric surface. Remote sensors may be used in long-distance (even beyond 200 m) measurements of surfaces vibrations of physical targets of various nature.

The other instruments on the market do not measure the angular velocity since they measure linear displacements or linear velocities. Other magnitudes can be inferred from these, but the essence is that they operate on linear dimensions. Some (interferometric) remote sensors measure displacements of the order of 1-10 picometers ($10^{-12}$ m), using the interferometric technique, but do not reach distances greater than 2-5 m. Other sensors called Laser Doppler Velocimeters, or LDV, cover distances greater than 50 m and measure linear velocities, exploiting the Doppler effect. There are no instruments with the potential to reach greater distances to the knowledge of the Inventors. On the contrary, optical remote sensors based on speckle tracking, such as Infrasonic Telesensors (TIS), can reach distances of hundreds of meters, but for many reasons, due to the so-called "optical lever" (see below) and to the vibrations typical of the remote sensor, they are not used directly in the infrasonic domain.

Delving in greater detail into the working principle of the speckle-tracking remote sensor, when a coherent beam of light illuminates a rough surface, the light is scattered, thus resulting in a random (but time-stationary) diffraction pattern, commonly called a speckle pattern. The speckle pattern is extremely sensitive to the microscopic detail of the reflective surface, which means that any deformation of the reflective surface gives rise to a change in the speckle pattern. For example, if the surface changes orientation by an angle $\theta$, the resulting speckle pattern will be roughly the same but translated by $\theta L$ (where L is the observation distance). It is this kind of "optical lever" that makes it possible to determine changes in inclinations of very small angles. If the local orientation of surface changes due to vibration, this can then be detected by an on-line correlation process between the various images $I_t$ acquired over time t. The remote sensor or telesensor 100 is based on the principle diagrammatically shown in FIG. 2:

a) A laser beam 101, produced by a laser 103 is focused, through a focusing optical system 110, onto a distant vibrating surface 102;

b) the scattered light 104 contains a speckle pattern I(t), which varies over time;

c) an array of photodetectors (CODs) 105 receives the speckle patterns at various times $I(t_1), I(t_2), \ldots I(t_n)$, which contain information about the vibration of the surface pointed by the laser 103;

d) the (on-line) analysis of these images makes it possible, albeit with a slight time delay quantifiable in a fraction of a second, to reconstruct the nature of the vibration, i.e., the amplitude, frequency, and harmonic content (or timbre) of the vibrating surface.

In FIG. 1, the transceiver (remote sensor) system is mounted on a stand 106 resting on a bench 107. A microcomputer 108, which processes information about the speckles and communicates, e.g., with a tablet 109, is also present.

Coming back to FIG. 2, it shows an application to a vibrating surface biased by an acoustic signal. W indicates the area of the surface hit by the laser at distance L from the detecting optics, being a the maximum vibration amplitude and $\theta$ the maximum surface deformation angle.

The remote sensor based on speckle tracking, and in particular its infrasonic version, is greatly affected by its own vibrations (tripod, bench, etc.), especially in the 0.1-4 Hz frequency range. The conventional active and passive controlled vibration absorbers do not respond effectively in this frequency range. Furthermore, because of the microseismic noise typically present in this band [4], the measurement is affected by the movement of the remote sensor itself. In conclusion, the measurement made by the remote sensor is affected by micro-seismicity and other environmental factors, such as traffic, wind, etc., which put the remote sensor itself into vibration. Therefore, such external events negatively condition the result of the correlation algorithm and the relative calculation of the center of mass of the correlation bell or centroid (as indicated in the above references) on which all the measurements obtained by speckles tracking systems are based. The sensitivity and accuracy performances required by remote vibration monitoring are listed in table 1 below and are not achievable by the prior art due to the aforesaid technical issues.

TABLE 1

| Parameter | Value |
| --- | --- |
| Sensitivity at 30 m | $>2 \cdot 10^{-8}$ rad |
| Accuracy (A) at 15 m | $\pm 5 \cdot 10^{-8}$ rad |

TABLE 1-continued

| Parameter | Value |
|---|---|
| Measurement time | ≤60 s |
| Lower bandwidth limit | 0.5 Hz |

The achievement of such specifications is only allowed by the correction of vibrational noise induced by external phenomena, thereby allowing the use of the speckle-tracking remote sensor in the following professional applications:
 a) monitoring of infrastructures (buildings, bridges, and various building structures);
 b) acoustic and infrasonic surveillance;
 c) vibrational monitoring directly in inaccessible places also for security purposes;
 d) measurements of vibrations induced by traffic and industrial activities;
 e) expeditious infrastructure measurements; and
 f) monitoring of small landslides.

The disturbances in telesensors and interferometric optical systems, in scanning and holographic microscopy, etc., are currently mitigated in various ways, each of which has its own limitations. These systems include benches and platforms with passive and active vibration absorbers (or isolators) [5], e.g., made by Thorlabs-Nexus and Minus K® Technology. Many experiments on optical benches and platforms employing the above techniques make use of such absorber-isolators. Passive ones have very complex internal structures (honeycomb or metamaterials etc.). Active isolation systems involve many issues and cannot be employed in an instrument such as the speckle-tracking remote sensor. Indeed, such systems are of considerable size and involve issues related to portability and are not implementable in speckle-tracking remote sensor. Sophisticated vibration absorbers are also employed in gravitational wave detection, such as Ligo and Virgo (Raffai et al., 2001). To correct the microseismic vibrations in the speckle-tracking remote sensor, one could employ accelerometers having the right sensitivity and linearity [7], [8] mounted on the support of the remote sensor. Although these systems serve their purpose in principle, known correction techniques are not applicable to achieve the required specifications as in table 1.

SUMMARY OF THE INVENTION

It is the purpose of the present invention to provide an optical-inertial accelerometer, a remote sensor based on speckle tracking and utilizing such an accelerometer, and a correction method of the vibrational noise of such a remote sensor equally utilizing the accelerometer, which solve the problems and overcome the drawbacks of the prior art, either in whole or in part.

It is subject matter of the present invention to provide an optical-inertial accelerometer, a speckle-tracking remote sensor utilizing said accelerometer, and a correction method of the vibrational noise of said remote sensor equally utilizing the accelerometer, according to the appended claims.

BRIEF DESCRIPTION OF THE FIGURES

The invention will now be described by way of example, with particular reference to the drawings of the accompanying figures, in which.

Figure 1:
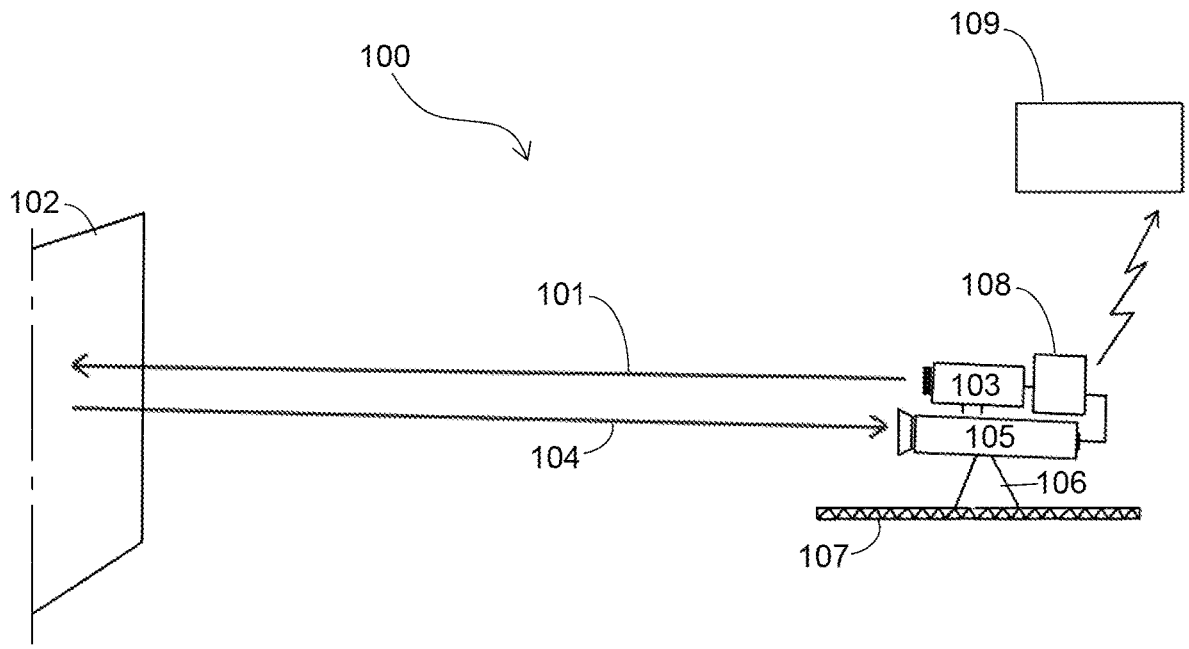
FIG. 1 shows a diagrammatic arrangement of a speckle-tracking infrasonic remote sensor, according to the prior art.
Figure 2:
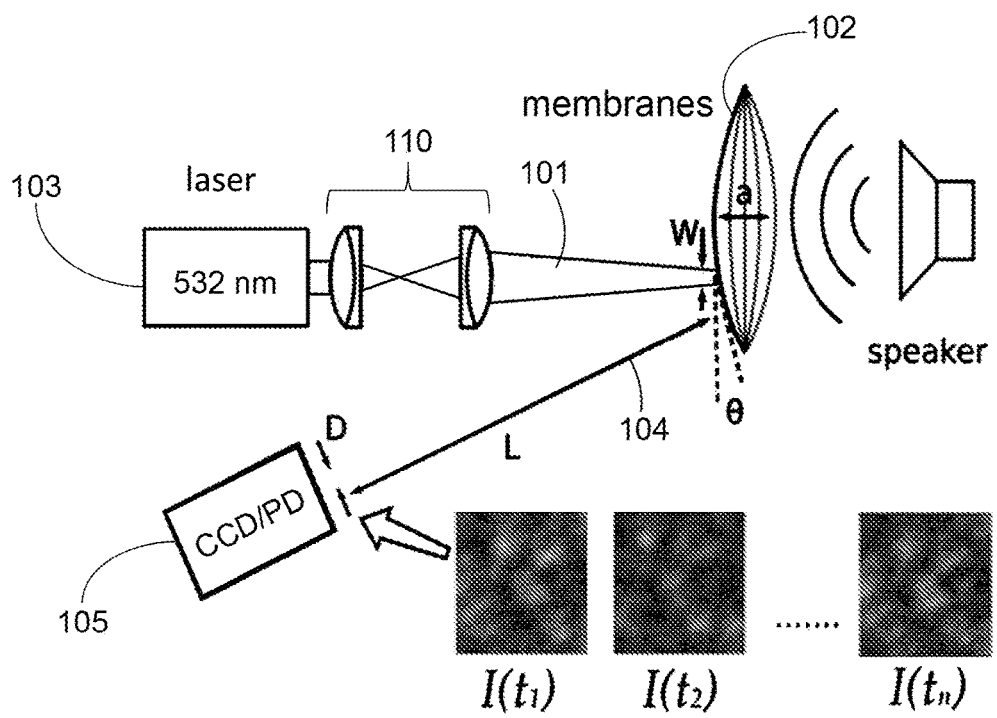
FIG. 2 shows a diagram illustrating the working principle of the speckle-tracking infrasonic remote sensor, according to the prior art.

It is worth noting that hereinafter elements of different embodiments may be combined together to provide further embodiments without restrictions respecting the technical concept of the invention, as a person skilled in the art will effortlessly understand from the description.

The present description also refers to the prior art for its implementation, with regard to the detail features which are not described, such as, for example, elements of minor importance usually used in the prior art in solutions of the same type.

When an element is introduced it is always understood that there may be "at least one" or "one or more".

When a list of elements or features is given in this description it is understood that the invention according to the invention "comprises" or alternatively "consists of" such elements.

DETAILED DESCRIPTION

Embodiments of the Correction System
Foreword

The present invention reduces the effects of the vibrational noise in the measurement made by speckle-tracking remote sensor.

Hereinafter, reference will be made only to the case of the TIS infrasonic remote sensor, because it is the one most affected by its own vibrations. However, everything that will be said applies equally to a sonic remote sensor and in general to the speckle-tracking remote sensor. The only difference is in the speed of the optical sensor and the data processing unit, which must be much higher in case of the sonic sensor. However, this hardware is available on the market and is not a subject matter of the present invention in itself.

The following results for the infrasonic remote sensor were achieved through the following steps:
 making a prototype of a new TIS device;
 analyzing the vibrational state of the TIS in the laboratory and under operating conditions;
 evaluating the error due to vibrational noise;
 creating and designing the accelerometer system of the invention;

making the prototype of the accelerometer of the invention;

integrating the accelerometer of the invention in the TIS prototype;

evaluating the results of the invention and verifying that the required specifications were achieved.

The invention can correct the value of the speckle pattern correlation centroid in the presence of displacements due to vibrational noise through a particular optical-inertial accelerometer, directly mounted near the CCD camera of the TIS. The accelerometric device can instantaneously highlight the displacements of the CCD sensor relative to an inertial reference, i.e., a mass immovable with respect to the fixed stars. Indeed, the relative movements of the sensor relative to an inertial mass, such as a seismometer or other mechanical accelerometer, can be assimilated to the movement of the mass relative to the photo-sensor.

The TIS predominantly observes angular velocities of the surface illuminated by the laser, along the two axes orthogonal to the line of sight (LOS). Because the structures are generally constrained in a horizontal plane, the translations of the speckle pattern along the vertical axis of the sensor reference system ($y_c$) are most relevant; hence the fundamental need to make the correction along this axis. Thus, we will assume that the TIS is unaffected by translations along the LOS and undergoes negligible translations orthogonally to the LOS, along $x_c$, compared to translations along the vertical axis, $y_c$.

It is also possible, according to the invention, to add a second and possibly a third accelerometer based on the same principle. For example, the parameters of an accelerometer for measuring displacements along $x_c$ would obviously be different from those of the accelerometer for measuring along $y_c$. Indeed, having to oscillate on a horizontal plane, the plate no longer has to counteract the force of gravity. The accelerometer parameters can be calculated under the given conditions.

Description of the Optical-Mechanical Prototype of the Invention

Figure 3:
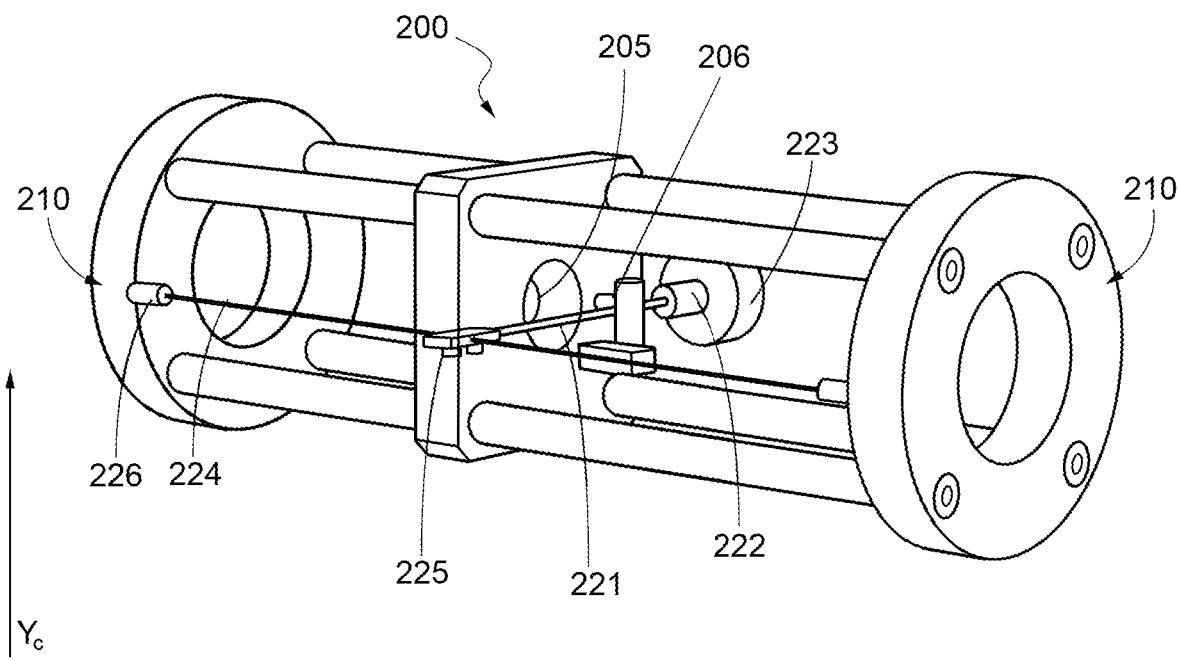
FIG. 3 shows an embodiment of the accelerometer according to the present invention.
Figure 4:
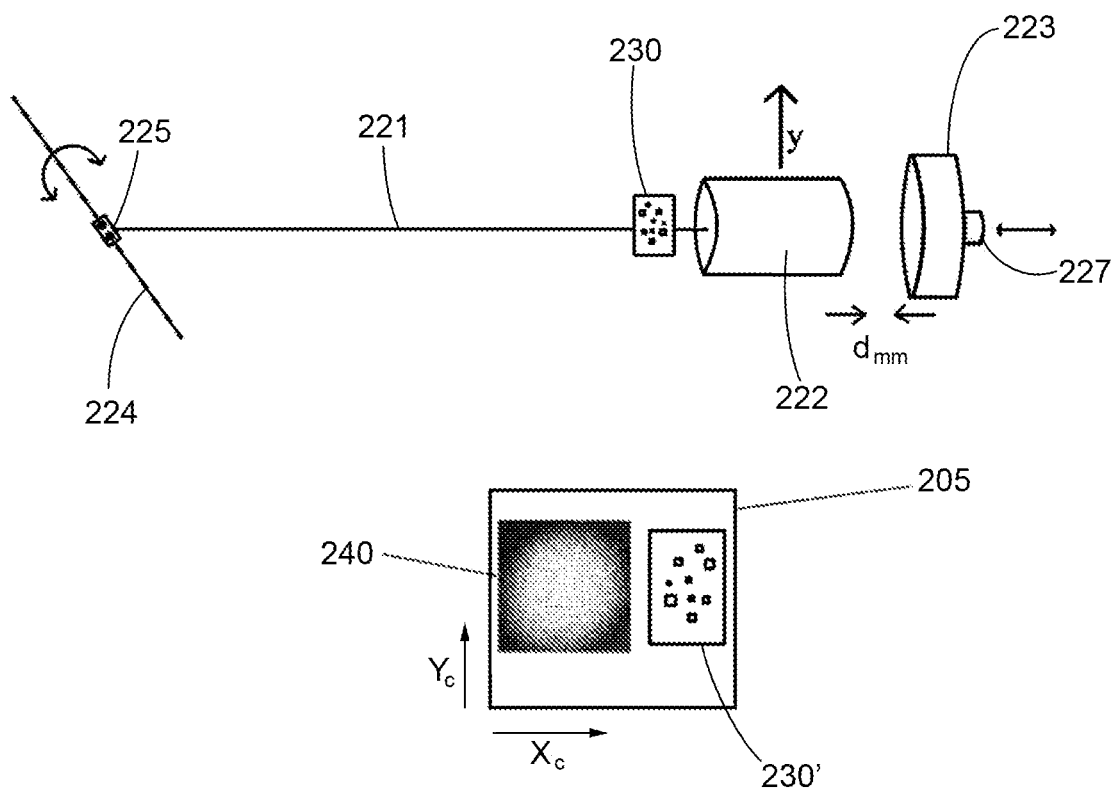
FIG. 4 shows an example of a diagram of an accelerometer with some details regarding an integration of the accelerometer and the TIS at CCD camera level, according to the invention.

Referring to FIGS. 3 and 4, the correction optical inertial system 200 is based on an inertial reference (i.e., not subjected to accelerations, thus a preferred reference system), with a small mass m 222 suspended by a lever of negligible weight 221 of length d (e.g. equal to 4 cm), in a horizontal position anchored in 225 to a thin plate (e.g. of length l≅13.5 cm) 224 (e.g. made of bronze or other metal, preferably non-magnetic) subjected to torsion. The strip (or linear element) 224 stretched (advantageously by virtue of a winder-tensioner 226) inside the optical receiver (of which only the frame 210 is shown) acts with an elastic torsional constant $k_\theta$ (e.g., of about $2.23 \cdot 10^{-5}$ [Nm], when the lever is in a horizontal position. The mass 222 is suspended and damped by a magnet 223 placed in front of it at a distance $d_{mm}$ (when the unexcited inertial mass is in an equilibrium position) adjustable by a controller 227 (the magnet is fixed to the frame 210, the fixing itself not being shown).

The system has moment of inertia $I=md^2$ and a period $T=2\pi-(I/k_\theta)^{1/2}$ (e.g., of about 0.6 s with the above example values) and it can be described as a magnetically damped torsional harmonic oscillator. For small arcs, the movements can be considered linear along y. This assumes that the vibration occurs only vertically (along y), so the CCD translates by a value $\pm\Delta y$ relative to the optical reference 230 integral with the mass. A weak light source 206 (conveniently a photodiode), illuminates the optical reference plate 230 which occupies in the CCD 205 only a rectangle 230' placed vertically to the side of the sensor, the rest of the sensor being dedicated to detecting the speckle pattern 240.

The calculation of the spatial correction, on computing level, can be operated by a microcomputer (e.g., Raspberry) employed in the TIS. To be able to operate the correction, the response of the oscillator is linear in the frequency range of interest. Therefore, the optical-inertial device must be critically damped (so as not to allow free oscillations) by inserting a magnetic brake 223. The magnetic damping occurs by cutting off the flux B, e.g. of the order of 0.2 Tesla, generated by a magnet (e.g. neodymium) of the size of a button of one centimeter in diameter with a small cylinder of diamagnetic metal, e.g. copper weighing 1 g with height h=5 mm and diameter D=5 mm, where eddy currents (acting as a damper) are generated. The power is dissipated in the copper cylinder and a damping coefficient $b \cong L_{eff} Dw\sigma B^2$ is introduced, with $L_{eff} \cong 2D$, $w \cong D/4$ the height of the layer, or of the two-base circular segment, where the magnetic field lines break down, and $\sigma = 5.8 \cdot 10^7$ [S/m] is the conductivity of copper. With these example values, a damping coefficient $b \cong 1.4 \cdot 10^{-2}$ [F/v] is obtained. To obtain an order of magnitude of the braking force F under such example conditions, we must consider the vibrational mean square velocity $v_{rms}$ which is of the order of μm/s and thus F is of the order of a dozen of nN. The damping coefficient can be adjusted simply with a screw 227 by varying the magnet-cylinder distance $d_{mm}$ (equivalently, another spacer or a metal other than copper can be used). The system thus made has a free oscillation frequency less than one Hertz, and this makes it possible to correct the frequencies of interest (1-45 Hz) with the correct phase.

Figure 5:
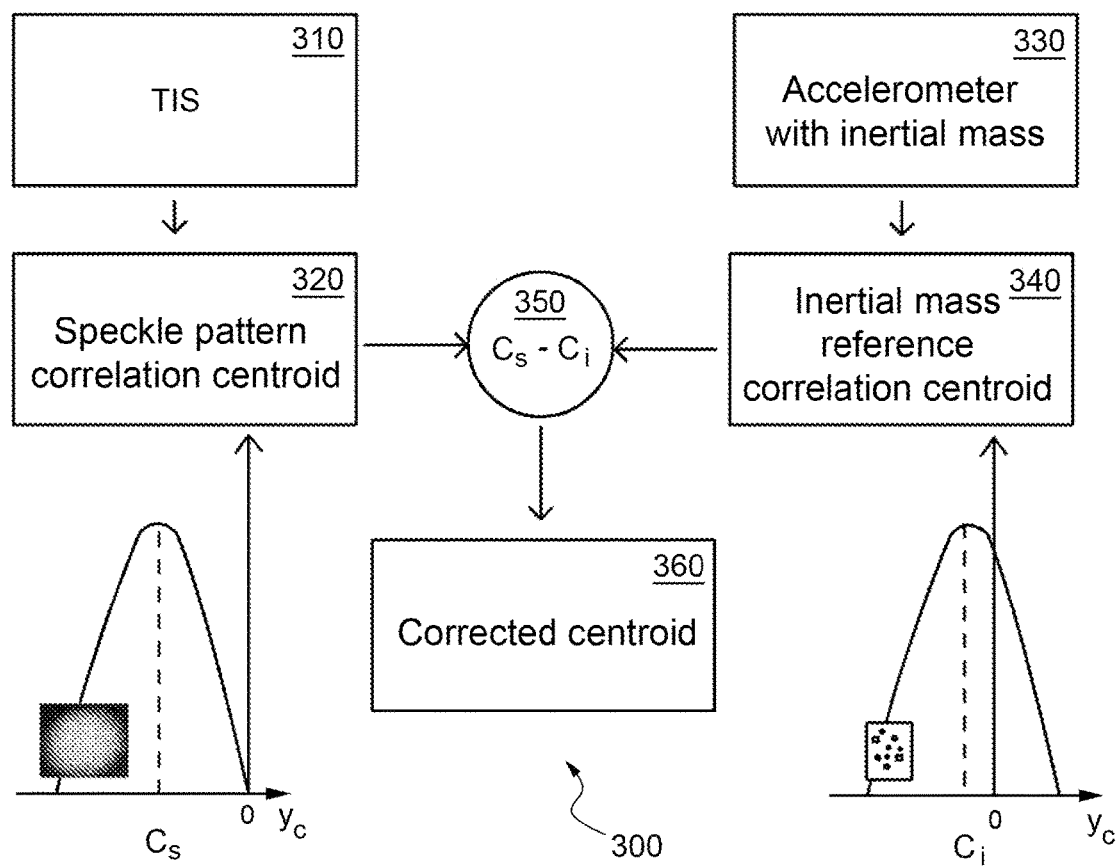
FIG. 5 shows a general diagram of the correction algorithm of the speckle pattern correlation centroid through the correlation centroid of the optical-inertial accelerometer, according to the present invention.

Also with reference to FIG. 5, the correlations are calculated on the speckle pattern $Corr_s$ and the mass displacement $Corr_i$, with the relative centroids computed on the bell thereof, $C^y_s$ and $C^y_i$. They necessarily have the same spatial resolution, and, in this manner, the correction is simple and immediate. Ultimately, the reading of the movement of the optical reference plate has the advantage of being done in close proximity to the optical sensor. This makes it possible to not employ any scaling and other complex mathematical operations at any level of analysis. The optical reference produced by the mass m needs only a back-lighting, e.g., by a piece of optical fiber or a weak photodiode. Although the optical-inertial accelerometer has been described here with reference to the speckle-tracking infrasonic remote sensor, it is also usable outside the remote sensor, having its own illumination and being able to be detected by an optical sensor.

Physical-Mathematical Justification of the Operation of the Invention

Referring to FIG. 5, an inertial optical system sensitive to oscillations along the vertical $y_c$ was installed in the TIS 310 to correct translations along this axis. According to the algorithm 300, Δy values (relative displacements between sensor and inertial reference in 330, due to vibrations along $y_c$) are calculated by a correlation process, similarly to the speckle pattern. Again, the correlation centroid $C^y_i$ will be calculated in 340, to correct the correlation centroid calculated in 320 on the speckle pattern $C^y_s$. Then one will be able to operate, in 350, a simple correction given by:

$$C^y = C^y_s - C^y_i$$

being $C^y$ the correct centroid in 360. Such a simple correction is actually valid for frequencies greater than the resonant frequency of the inertial optical accelerometer. For frequencies close to resonance or lower the following, more general, would apply:

$$C^y = C^y_s - C^y_i(f_y)$$

where the centroid returned by the accelerometer is a function of the frequency $f_y$ of the signal detected by the accelerometer. The two correlations related to the displacements of the speckle pattern and the inertial reference are performed simultaneously because they occupy, at time t, two distinct portions of the CCD and also have the same resolution. The correction according to the invention is certainly the most immediate and also the most accurate since it operates close to the optical center of the sensor.

In case of insertion of a second accelerometer along $x_c$, another portion of the optical sensor should be dedicated to detecting the oscillations of the second optical reference along this axis. The correction of the centroid of the speckles along $x_c$ (which is already computed) is similar to the one made along the $y_c$ axis. It is necessary to calculate the correlation centroid of the second accelerometer along $x_c$ to be subtracted from the aforesaid correlation centroid of the speckles.

The correction formula along the $y_c$ axis exposed above can be rewritten as $C^x = C^x_s - C^x_i(f_x)$, and is also valid for the correction with the second accelerometer along $x_c$, where $C^x$, $C^x_s$ and $C^x_i(f_x)$ mean the corrected centroid along the axis $x_c$, the centroid of the speckles along the axis $x_c$ and the centroid of the second accelerometer along the axis $x_c$, respectively. $f_x$ indicates the frequency of the signal detected by the second accelerometer.

Such corrections could not be made directly with a commercial accelerometer, as it would be off-center relative to the CCD. An immediate comparison between the two centroids $C_s$ and $C_i$ (along y and/or x) even before correction, is of great use because it determines the operating conditions at the vibrational level of the TIS. An incorrect choice of support, excessive microseismic vibrations, excessive traffic-induced, and environmental vibrations would be immediately apparent and effectively evaluated to make the correction not only algorithmically but also physically.

Other unquestionable advantages of the suggested solution are due to the following considerations:
- total absence of power and data connections,
- system linearity above the resonance frequency (constant phase),
- possibility of direct correction at tilt angles of less than about 30 degrees,
- accelerometer absolute calibration not required.

Experimental Evaluation of the Invention (Piezoelectric Vibrator Test)

The specifications shown in table 1 were evaluated before and after the correction with a prototype described below, according to an embodiment of the invention. A highly accurate calibration was achieved using the Steminc SMPF61W20F50 piezoelectric vibrator, excited with an AC voltage between 1 and 50 mVpp in the frequency range 0.1-45 Hz under TIS operating conditions with laser power of 1 and 50 mW. We assumed that far from the resonant frequency of the piezoelectric (50 Hz) its behavior is linear with an angular response θ of $5.1 \cdot 10^{-8}$ rad/mV. The piezoelectric (target) placed at the distance of 15 and 30 m was excited at 17.2 and 4 Hz with two different voltage values of 1 and 50 $mV_{pp}$, corresponding to angular values of $5.1 \cdot 10^{-8}$ and $2.55 \cdot 10^{-6}$ rad. The results are shown in the table below, where the accuracy Δ and other measured efficiency parameters (not shown in the table) were verified to be precisely the ones that were intended to be achieved as shown in Table 1.

TABLE 2

Piezoelectric excited at 1 mVpp at a frequency of 17 Hz (first two rows) and then 50 mVpp at the frequencies of 2, 4, and 17 Hz at distances of 15 and 30 m.

| Piezoelectric voltage | Distance m | Frequency Hz | (θ ± Δ in rad) of the target | Centroid in pixels | Centroid in meters |
|---|---|---|---|---|---|
| 1 $mV_{pp}$ | 15 | 17 | $5.1 \cdot 10^{-8}$ | $2.7 \cdot 10^{-3}$ | $2.97 \cdot 10^{-9}$ |
| 1 $mV_{pp}$ | 30 | 17 | $5.1 \cdot 10^{-8}$ | $2.72 \cdot 10^{-3}$ | $2.99 \cdot 10^{-9}$ |
| 50 $mV_{pp}$ | 15 | 17 | $2.55 \cdot 10^{-6}$ | $1.25 \cdot 10^{-1}$ | $1.385 \cdot 10^{-7}$ |
| 50 $mV_{pp}$ | 30 | 17 | $2.55 \cdot 10^{-6}$ | $1.35 \cdot 10^{-1}$ | $1.485 \cdot 10^{-7}$ |
| 50 $mV_{pp}$ | 30 | 4 | $2.55 \cdot 10^{-6}$ | $1.29 \cdot 10^{-1}$ | $1.425 \cdot 10^{-7}$ |
| 50 $mV_{pp}$ | 30 | 2 | $2.55 \cdot 10^{-6}$ | $1.31 \cdot 10^{-1}$ | $1.445 \cdot 10^{-7}$ |

Embodiments of the TIS

Starting from the background art, the Inventors developed a prototype of speckle-tracking infrasonic telesensor (TIS) operating in the 0.1-45 Hz frequency band.

Vibration Remote Sensor Assembly

Figure 6:
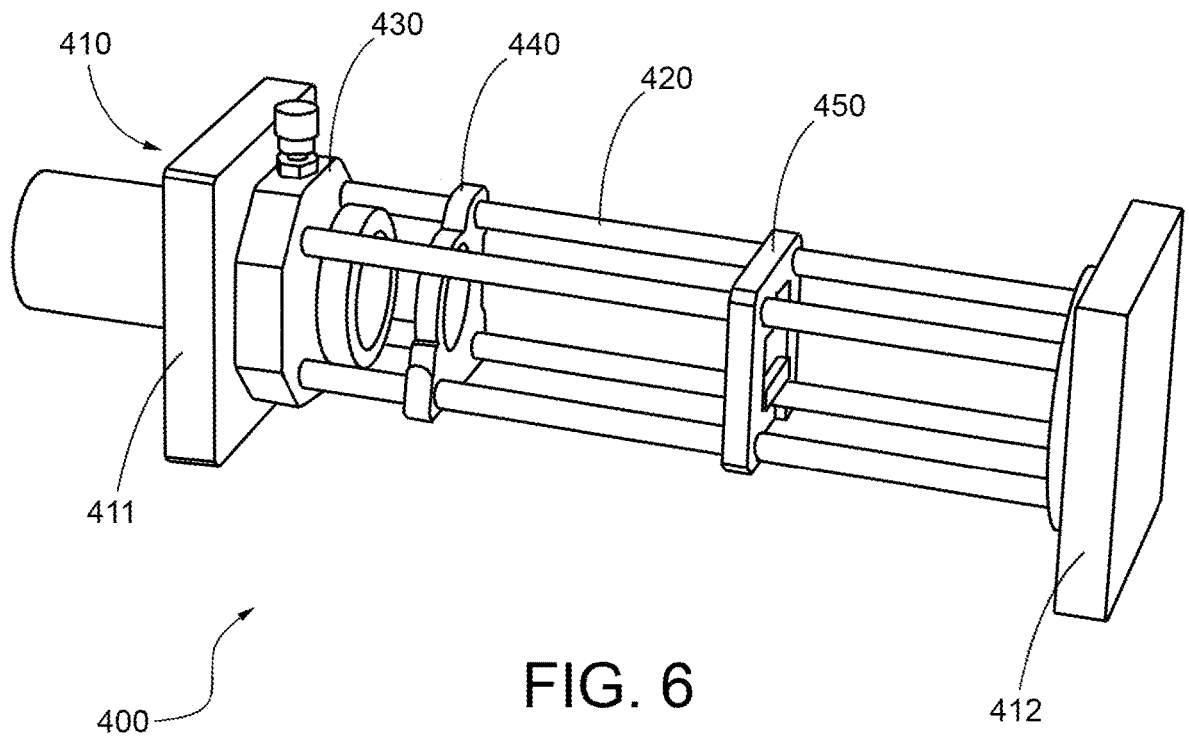
FIG. 6 shows an assembly of the receiving optics with translator, diaphragm, filter, and CCD, in cross section, in an embodiment of the TIS according to the invention.
Figure 7:
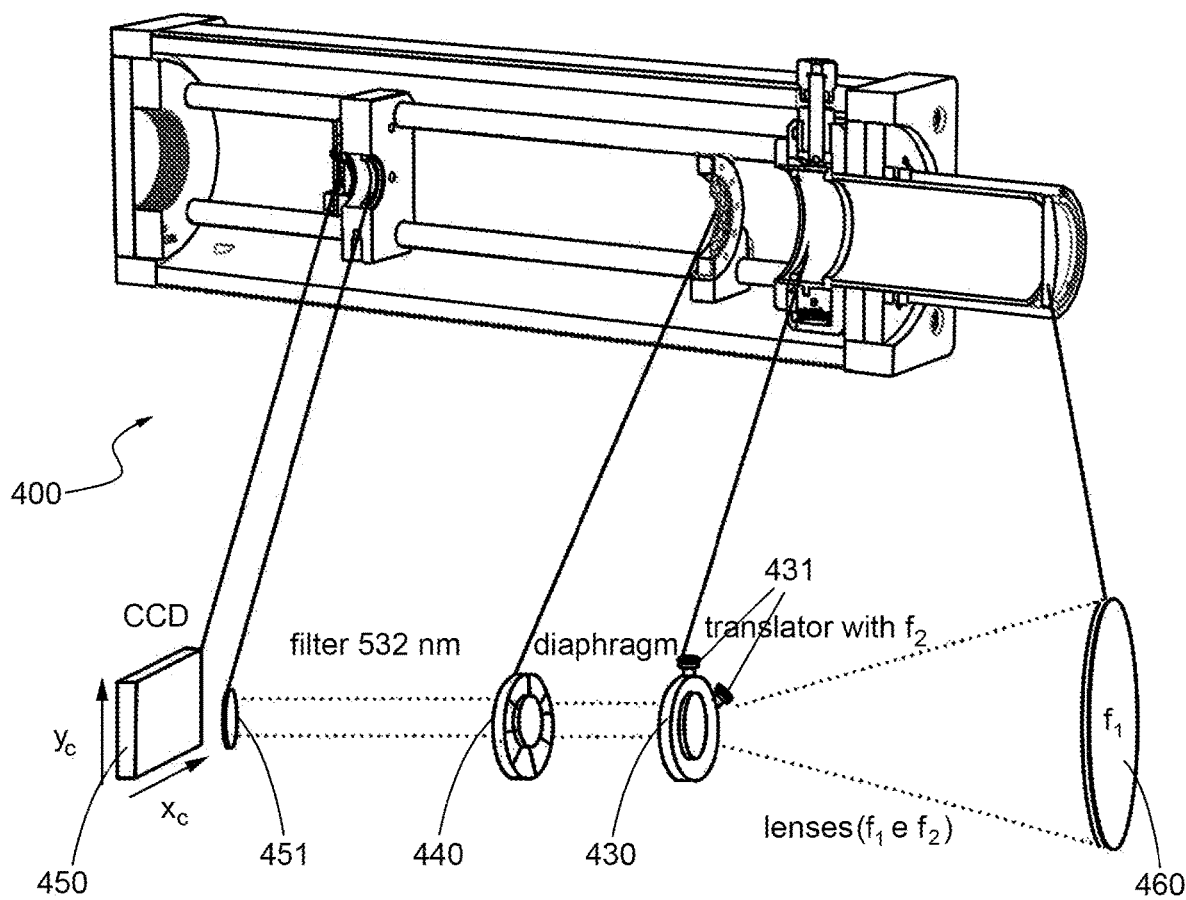
FIG. 7 diagrammatically completes FIG. 6 and shows the receiving optics with 1" lens group and f1 and f2 lenses, translator, diaphragm, 532 nm filter, and CCD camera.
Figure 8:
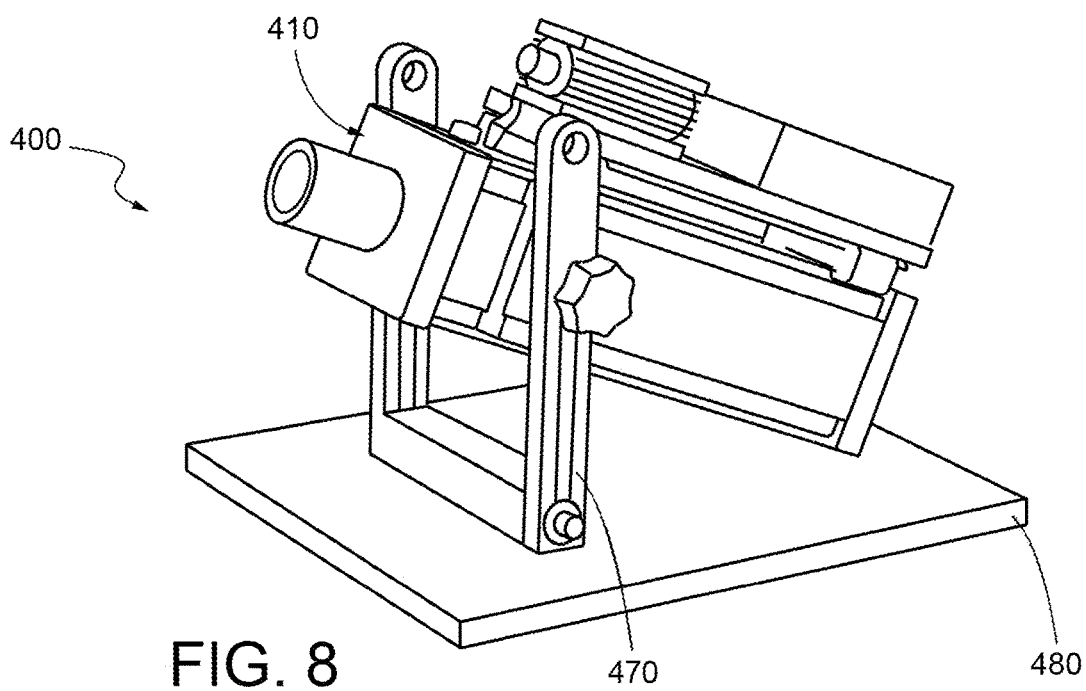
FIG. 8 shows the device of FIG. 6 assembled with a sliding guide as well as a small and robust stand, according to an embodiment of the invention.

With reference to FIGS. 6-8, it was chosen to mount the entire receiving optics on a frame 410 comprising supports formed by 4 rigid rods 420 having a diameter of 0.5 cm and a length of about 26 cm occupying the corners of a square section having ends 411 and 412. Such a configuration 400 is good for supporting through mounts and adapters all lenses 460, filters 451, translator 430, diaphragm 440, and CCD sensor 450 (camera). The receiving optical system was simulated with a geometric optics program before assembling, in order to calculate the correct distances between the lenses and between the lenses and the CCD sensor. Furthermore, with such a simulator it was possible to verify the actual sensitivity due to the receiving optics only, although such a magnitude depends, as we will see later, also on other parameters.

The design and construction of the stand 470 resting on the base 480 was an integral part of the entire assembly. The stand shown in FIG. 8 was chosen to reduce the vibrations of the telesensor. The choice of the profile in FIG. 8, with a special support, made it possible to fix the Sunshine Laser 532 nm with a maximum power of 50 mW, the beam of which is adjustable with focus independent from the optical receiver. The laser was mounted using the special XT66C4 sliding supports on the same guide of the XT66-200 profile that constitutes the body of the receiving optics.

Of course, these (and those described hereinafter) were specific construction choices provided by way of example and in no way limiting the generality of the invention.

Wiring and Data Transfer

The following example solutions were adopted for the electrical wiring of the components and data transfer to the PC. A Raspberry Pi3 B+ microcomputer directly interfaced through a 10 cm multi-core strip with a 1.1×1.1 mm CCD type "Camera Module V2.1 3pcs", minimizes the length of electrical wiring. The microcomputer is powered by a 12 V DC 12 Ah battery and a DC-DC converter with an output of 5V DC-3 A. The laser, which requires less power, is also powered separately at 5 V DC. All other connections concerning the incoming and outgoing data transfer were implemented with a WiFi network between the microcomputer and the tablet (or smartphone) or through an Ethernet connection.

Optical Collimation of the Remote Sensor

In the assembling of the mechanics of the receiving optical system and the stand, some mechanical devices have been provided to facilitate the collimation between the laser beam and the receiving device. Some aluminum components already available on the optical components market made by Thorlabs were chosen for this need. The XT66-200 profile, with the necessary modifications concerning the installation of the translator, was used in the final assembly of the remote sensor, obtaining special slots on the profile itself. The translator containing the divergent lens f2 460 as shown in the diagram in FIG. 7, allows the collimation of the receiving optics, especially on the vertical y-axis, because the aiming on the x-axis is provided by the profile guide.

This example solution allows the fine adjustment of the two knobs 431, shown in FIG. 7, to collimate the laser beam which is kept as fixed as possible in the guide. The final configuration of the assembly is shown in FIG. 8.

Description of Examples of Algorithm Employed in the TIS

Examples of mathematical algorithms necessary for the detection of the angular velocity of the surface struck by the laser footprint are described in this section.

The $x_c$, $y_c$ reference system of the CCD within the TIS with $x_c$ horizontal axis and $y_c$ vertical axis will be considered. In an example of an embodiment of the invention, the TIS substantially operates a two-dimensional spatial correlation on an image of 64×64 pixels acquired at a sampling rate of 90 fps. Diagrammatically, for each frame, we have the following steps:

Acquiring of the speckle pattern (90 fps) at time $t_{n+1}$ on the CCD (240×240 pixels).

Selecting a 64×64 pixel square in the middle of the frame.

Two-dimensional correlation implemented by means of the two-dimensional Fast Fourier Transform (FFT) product between the frame at time t and the conjugate FFT of the frame at time t+1.

Selecting only the peak of the previously obtained two-dimensional correlation figure by means of a variable threshold.

Calculating the centers of mass (centroids) along $x_c$ and $y_c$ on all selected points of the correlation process weighted by their value and relative position.

This latter operation, relative to the individuation of the correlation peak maximum, makes it possible to obtain a spatial resolution of the translations of the speckle pattern on the CCD, lower than one pixel. The actual resolution depends on the number of values above the threshold (fixed or moving) and the width of the correlation peak (quality of the correlation). Since these values may vary with each correlation process in a non-deterministic manner, the resolution can only be estimated statistically.

The previous operation provides time segments along $x_c$ and $y_c$, which express the translation velocities $v_x(t)$ and $v_y(t)$ of the speckle pattern on the CCD, respectively. These quantities are related, through a proportionality factor, to the angular velocities of rotation of the examined surface.

A time integration of $v_x(t)$ and $v_y(t)$ is then performed to obtain the time displacements of the speckle pattern $s_x(t)$ and $s_y(t)$.

The same correlating and centroid calculating operations are performed on the portion of the CCD which detects the position of the optical reference constituted by the inertial mass along $y_c$.

At this stage, the difference between the centroid $C^y_s$ and the centroid $C^y_i$ along $y_c$ is operated, as previously described.

Finally, a Fourier Transform (1024 points) of the time sequences $v_x(t)$ and $v_y(t)$ (or $s_x(t)$ and $s_y(t)$) is performed to display the results in the frequency domain (frequency spectrum of the vibrational detection).

Advantages of the Invention

Some of the advantages of the invention are listed below:

full integration of the accelerometer in the speckle-tracking vibration remote sensor measuring instrument, in particular in the TIS, possibility of instantaneous measurement of the movement of the center of the optical sensor of the speckle-tracking vibration remote sensor relative to an inertial reference, possibility of performing direct correction of the correlation centroid, total absence of power and data connections in the accelerometer, linearity of the accelerometer above the resonance frequency (approximately constant phase for frequencies above 1 Hz), possibility of direct correction at angles of less than about 30 degrees, and absolute accelerometer calibration not required.

The speckle-tracking vibration remote sensor, in particular the TIS, by virtue of the described technique (speckle-tracking) with the solutions implemented in it and previously described in detail, can perform the direct correction of the correlation centroid. Indeed, the invention allows the simultaneous measurement of the displacements of the optical sensor itself and thus the removal of these from the vibrational measurement of the distant surface. Thus, a passage from a measurement of the relative vibrations of the distant surface to a measurement of the absolute vibrations of the same surface is achieved.

BIBLIOGRAPHY

[1] Silvio Bianchi, "Vibration detection by observation of speckle patterns," Appl. Optics 53, 931-936 (2014).

[2] Bianchi Silvio, Giacomozzi Emanuele (2019), Long-range detection of acoustic vibration by speckle tracking—Applied Optics. Vol. 58 (28) pp. 3397-3406, Ed. Optical Society of America.

[3] Z. Zalevsky, Y. Beiderman, I. Margalit, S. Gingold, M. Teicher, V. Mico, and J. Garcia, "Simultaneous remote extraction of multiple speech sources and heart beats from secondary speckles pattern," Opt. express 17, 21566-21580 (2009).

[4] Jon Peterson, 1993. Observation and modeling of seismic background noise. "Open-File report 93-322, 85.

[5] John Wallace, 2015. Photonics Products: Vibration-Isolation Tables: Isolation tables support stable optical setups, Laser Focus World.

[6] Raffai ed al., 2001. Inverted pendulum as low frequency pre-isolation for advanced gravitational wave detectors, Nuclear Instruments and Methods in Physics Research A.

[7] Galupov et al., 2018. Physical Principles of a Piezo Accelerometer Sensitive to a Nearly Constant Signal, Sensors MPDI.

[8] PCB Piezotronics, Series 393, Sensors for seismic testing 2019, pcb.com/seismic.

Hereto, we have described the preferred embodiments and suggested some variants of the present invention, but it is understood that a person skilled in the art can make modifications and changes without departing from the respective scope of protection, as defined by the appended claims.

What is claimed is:

1. A vibration remote sensor based on speckles tracking, comprising the following components integral to a horizontal plane:

a laser configured to emit a coherent light signal along an axis incident on a distant surface;

receiving optics of a light signal returning from said distant surface along an optical axis;

a measuring sensor of said light signal returning from said distant surface along said optical axis;

an electronic processing unit of data detected by said measuring sensor configured to calculate a speckle pattern correlation;

wherein:

a first accelerometer is positioned between the receiving optics and the measuring sensor, the first accelerometer comprising:

a linear element having torsion constant $k_\theta$, which is stretched, parallel to the optical axis, between two ends of a frame;

a mechanical arm transversely fixed to said linear element;

a first inertial metallic mass placed at one end of said mechanical arm opposite to said linear element;

a magnet integral with said frame and positioned in front of said first inertial metallic mass at an adjustable distance $d_{mm}$ therefrom;

a first optical reference integral with the first inertial metallic mass;

a light source configured to illuminate said first optical reference; and a sensor for optical detection of a movement, normal to the optical axis, of said first optical reference integral with the first inertial metallic mass;

said first accelerometer is positioned so that the first inertial metallic mass is free to oscillate at least along a first direction ($y_c$), which is perpendicular to said horizontal plane;

said light source is different from said laser; and said measuring sensor is additionally configured to detect successive images of the first optical reference, which is integral to the first inertial metallic mass, to measure its displacements along the first direction ($y_c$).

2. The vibration remote sensor of claim 1, further comprising a distance meter configured to adjust said adjustable distance $d_{mm}$.

3. The vibration remote sensor of claim 1, wherein said light source is constituted by an optical fiber or a photodiode.

4. The vibration remote sensor of claim 1, wherein a second accelerometer with a second inertial metallic mass is positioned between the receiving optics and the measuring sensor, the second accelerometer being constituted as said first accelerometer, so as to measure displacements of a second optical reference, which is integral with said second inertial metallic mass, along a second direction ($x_c$) of said horizontal plane.

5. The vibration remote sensor of claim 1, wherein the vibration remote sensor is an infrasonic remote sensor.

6. A correction method of vibrational noise of a vibration remote sensor based on speckles tracking, the method comprising:

providing a vibration remote sensor based on speckles tracking, comprising the following components integral to a horizontal plane:

a laser configured to emit a coherent light signal along an axis incident on a distant surface;

receiving optics of a light signal returning from said distant surface along an optical axis;

a measuring sensor of said light signal returning from said distant surface along said optical axis;

an electronic processing unit of data detected by said measuring sensor configured to calculate a speckle pattern correlation;

wherein:

a first accelerometer is positioned between the receiving optics and the measuring sensor, the first accelerometer comprising:

a linear element having torsion constant $k_\theta$, which is stretched, parallel to the optical axis, between two ends of a frame;

a mechanical arm transversely fixed to said linear element;

a first inertial metallic mass placed at one end of said mechanical arm opposite to said linear element;

a magnet integral with said frame and positioned in front of said first inertial metallic mass at an adjustable distance $d_{mm}$ therefrom;

a first optical reference integral with the first inertial metallic mass;

a light source configured to illuminate said first optical reference; and a sensor for optical detection of a movement, normal to the optical axis, of said first optical reference integral with the first inertial metallic mass;

said first accelerometer is positioned so that the first inertial metallic mass is free to oscillate at least along a first direction ($y_c$), which is perpendicular to said horizontal plane;

said light source is different from said laser; and said measuring sensor is additionally configured to detect successive images of the first optical reference, which is integral to the first inertial metallic mass, to measure its displacements along the first direction ($y_c$);

calculating a correlation centroid $C^y_s$ of a speckle pattern and a correlation centroid $C^y_i(f_y)$ of a displacement pattern of said first optical reference along said first direction ($y_c$), wherein $f_y$ is a frequency of a signal detected by said first accelerometer; and calculating the corrected correlation centroid of the speckle pattern along said first direction ($y_c$) as $C^y = C^y_s - C^y_i(f_y)$.

7. The correction method of claim 6, wherein a second accelerometer with a second inertial metallic mass is positioned between the receiving optics and the measuring sensor, the second accelerometer being constituted as said first accelerometer, so as to measure displacements of a second optical reference, which is integral with said second inertial metallic mass, along a second direction ($x_c$) of said horizontal plane, the method further comprising calculating the correlation centroid $C^x_s$ of a speckle pattern and the correlation centroid $C^x_i(f_x)$ of a displacement pattern of said second optical reference along said second direction ($x_c$), wherein $f_x$ is a frequency of a signal detected by said second accelerometer, and wherein the corrected correlation centroid of the speckle pattern along said second direction ($x_c$) is calculated as $C^x = C^x_s - C^x_i(f_x)$.

* * * * *